United States Patent
Muchow et al.

[11] Patent Number: 6,076,404
[45] Date of Patent: Jun. 20, 2000

[54] MICROMECHANICAL SENSOR INCLUDING A SINGLE-CRYSTAL SILICON SUPPORT

[75] Inventors: Joerg Muchow; Horst Muenzel, both of Reutlingen; Michael Offenberg, Teubingen; Winfried Waldvogel, Reutlingen, all of Germany

[73] Assignee: Robert Bosch GmbH, Stuttgart, Germany

[21] Appl. No.: 08/791,106

[22] Filed: Jan. 29, 1997

Related U.S. Application Data

[63] Continuation of application No. 08/470,373, Jun. 6, 1995, Pat. No. 5,616,514, which is a continuation-in-part of application No. 08/253,883, Jun. 3, 1994, abandoned.

[30] Foreign Application Priority Data

Jun. 3, 1993 [DE] Germany .............................. 43 18 466

[51] Int. Cl.[7] ................................................. G01P 15/125
[52] U.S. Cl. ......................................................... 73/514.32
[58] Field of Search ........................... 73/514.32, 514.33, 73/514.35, 514.36, 514.38, 514.21, 514.24; 257/419; 338/2, 5; 361/280; 438/52

[56] References Cited

U.S. PATENT DOCUMENTS

| | | |
|---|---|---|
| 3,909,924 | 10/1975 | Vindasius et al. . |
| 4,003,127 | 1/1977 | Jaffe et al. . |
| 4,665,610 | 5/1987 | Barth . |
| 4,670,969 | 6/1987 | Yamada et al. . |
| 4,699,006 | 10/1987 | Boxenhorn . |
| 4,776,924 | 10/1988 | Delapierre .......................... 73/514.33 |
| 4,948,456 | 8/1990 | Schubert . |
| 5,095,401 | 3/1992 | Zavracky ............................. 73/514.33 |
| 5,151,763 | 9/1992 | Marek et al. . |
| 5,194,402 | 3/1993 | Ehfeld et al. . |
| 5,195,371 | 3/1993 | Greiff .................................... 73/514.35 |
| 5,233,213 | 8/1993 | Marek .................................. 73/514.33 |
| 5,360,754 | 11/1994 | Pribat et al. . |
| 5,429,993 | 7/1995 | Beitman . |
| 5,578,755 | 11/1996 | Offenberg ............................ 73/514.32 |

FOREIGN PATENT DOCUMENTS

| | | |
|---|---|---|
| 40 00 903 | 8/1990 | Germany . |
| 40 03 473 | 8/1991 | Germany . |
| 92/03740 | 3/1992 | WIPO . |

OTHER PUBLICATIONS

C.W. Pearce, "Epitaxy", VLSI Technology, pp. 51–91, International Student Edition, McGraw–Hill International Book Company.

A.C. Adams, "Dielectric and Polysilicon Film Deposition", pp. 93–107, International Student Edition, McGraw–Hill International Book Company.

*Primary Examiner*—Helen C. Kwok
*Attorney, Agent, or Firm*—Kenyon & Kenyon

[57] ABSTRACT

A micromechanical sensor includes a support of silicon substrate having an epitaxial layer of silicon applied on the silicon substrate. A part of the epitaxial layer is laid bare to form at least one micromechanical deflection part by an etching process. The bared deflection part is made of polycrystalline silicon which has grown in polycrystalline form during the epitaxial process over a silicon-oxide layer which has been removed by etching. In the support region and/or at the connection to the silicon substrate, the exposed deflection part passes into single crystal silicon. By large layer thicknesses, a large working capacity of the sensor is possible. The sensor structure provides enhanced mechanical stability, processability, and possibilities of shaping, and it can be integrated, in particular, in a bipolar process or mixed process (bipolar-CMOS, bipolar-CMOS-DMOS).

12 Claims, 4 Drawing Sheets

MICROMECHANICAL SENSOR INCLUDING A SINGLE-CRYSTAL SILICON SUPPORT

This application is a continuation application of Ser. No. 08/470,373 filed Jun. 6, 1995, U.S. Pat. No. 5,616,514 which is a continuation-in-part of application Ser. No. 08/253,883, filed Jun. 3, 1994, abandoned.

BACKGROUND OF THE INVENTION

German Patent Application No. 40 00 903 shows a micromechanical sensor configured as an acceleration sensor which is manufactured on the basis of silicon micromechanics. The sensor includes a support made of a silicon substrate with an epitaxial layer of silicon applied to the silicon substrate. A part of the epitaxial layer is laid bare by an etching process to provide micromechanical deflection parts in the form of tongues. One or more tongues are suspended for this purpose from one or more webs and are deflected from the rest of the sensor structure under the action of a force on the sensor. Means are furthermore provided for evaluating the deflection.

German Patent Application No. 40 03 473 discusses taking crystallographic angles of a single-crystal silicon wafer into consideration in connection with the development and arrangement, as well as for the etching process. To provide a means for evaluating the deflection of the tongues, individual electrodes, which are each electrically insulated from each other, are provided so that a capacitative change between tongue and electrode is measurable.

The laying bare of the tongues as a component of the epitaxial layer is effected by means of a rear etching. This constituted an additional process as compared with an ordinary bipolar process.

From PCT application Ser. No. WO 92/03740, it is known to apply, on a support made of a silicon substrate, a layer of polycrystalline silicon onto a silicon-oxide layer having contact windows in an LPCVD process (low pressure chemical vapor disposed). The silicon oxide layer is removed by an etching process, as a result of which the polycrystalline silicon layer is present at a distance from the silicon substrate as tongue or electrode on the supports formed in the contact windows. The deposition rate of low voltage LPCVD-poly is about 60 Å/min and is thus very slight as compared with the separation rate of about 1 $\mu$/min of epitactic polysilicon. Due to this, for reasons of process economy, only relatively thin LPCVD layers can be produced. As the result, the working capacity of a lateral acceleration sensor, for example, is limited by the correspondingly small layer thicknesses of the tongues. Furthermore, additional silicon depositions are necessary for this procedure, as compared with a conventional bipolar process.

SUMMARY OF THE INVENTION

In accordance with the present invention, production of the exposed deflection part of polycrystalline silicon, or the mechanically active layer, can be accomplished without additional expense as part of a bipolar or MOS process. Moreover, no additional silicon depositions are necessary.

Epitaxy is a known special process for the production of single-crystal layers of silicon. In accordance with the present invention, epitaxial layers deposited in polycrystalline form (over silicon-oxide), or other non-crystalline layers, are used which are applied in the course of a conventional bipolar process.

Since the epitaxial deposition rate is very high as compared with an LPCVD process, relatively thick layers of 10 to 30 $\mu$m can be produced in accordance with the present invention, thereby increasing the working capacity of the lateral sensor.

In accordance with the present invention, a silicon oxide layer is applied to a silicon substrate at a position where one or more micromechanical deflection parts are to be formed. Contact window openings are formed on the silicon substrate adjacent to the silicon-oxide layer. An epitaxial layer of silicon is then deposited on both the silicon oxide layer and the contact openings. The epitaxial layer grows in polycrystalline form on the silicon oxide layer. However, the epitaxial layer grows in single crystal form on the contact window openings to provide a direct connection to the silicon substrate. Lateral structural limitations of one or more micromechanical deflection parts are then formed by etching through the polycrystalline portion of the epitaxial layer in narrow etch pits to form trenches using, for example, an anisotropic plasma etching technique. Finally, the silicon-oxide layer is removed during an etching process to complete the formation of the one or more micromechanical deflection parts.

One particular advantage of the present invention is that the method according to the present invention can be universally employed for different designs. For example, arrangements of tongues which are supported on one side and plates which are supported on edge regions are both possible. Moreover, several layers can be produced one above the other. Another advantage is that, using the same method steps and without additional expense, integrated electronic circuits, particularly an evaluation circuit for the deflection, can be produced on the same support with the micromechanical sensor. Similarly, electrical insulation of the micromechanical sensor parts from other electronic components on the same support is possible with the customary manufacturing steps.

BRIEF DESCRIPTION OF THE DRAWINGS

FIG. 3b is a cross section through the sensor of FIG. 3a.

DETAILED DESCRIPTION OF THE INVENTION

FIG. 1 shows a support 1 of silicon substrate on which a silicon-oxide layer 2 is applied. Contact window openings 3, 4 to the silicon substrate are produced around this silicon-oxide layer 2.

The silicon-oxide layer 2 can either be undoped or contain phosphorus, boron or As doping. Doping leads advantageously to a shorter etching process upon the subsequent removal of the silicon-oxide layer 2, or can also serve for the doping of the mechanically movable silicon structure.

Still other layers such as silica nitride or polysilicon can, if desired, be applied on the oxide layer.

Figure 1A:
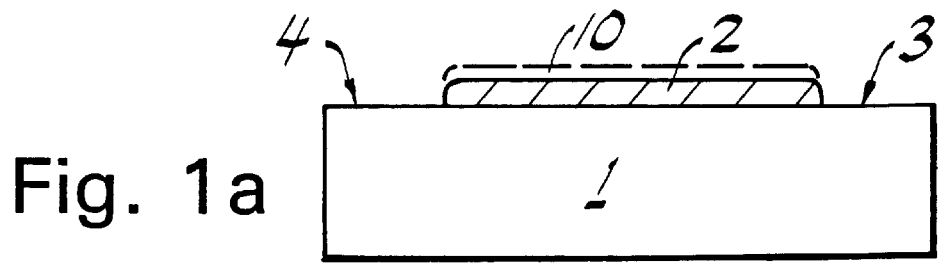
FIGS. 1a through 1d show cross sections through a sensor according to the present invention during different stages of manufacture.
Figure 1B:
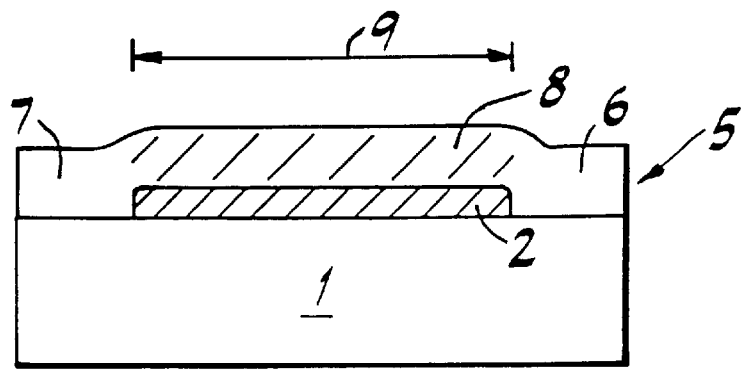

In accordance with FIG. 1b, an epitaxial layer 5 of silicon is deposited on the support 1 and/or the silicon-oxide layer 2 and the contact-window openings 3, 4. Epitaxy is a known special process for producing single-crystal layers of silicon. In accordance with the present invention, the epitaxial layer 5 grows, in single-crystal manner, only on support regions 6, 7 over the silicon substrate 1. On the silicon oxide layer 2 within a region 8 corresponding approximately to the width of the arrow 9, however, the epitaxial layer grows in polycrystalline form (indicated by the hatching).

The support as silicon wafer is preferably aligned in a crystal direction. Orientation in the (100) direction is technically important for an MOS and BICMOS process and the alignment (111) for a bipolar process. A (110) alignment is technically less relevant.

In order to improve the quality of the polycrystalline epitaxial layer (region 8), a poly-start layer 10 can be applied to the silicon-oxide layer 2 before the epitaxy, as indicated in dashed line in FIG. 1a.

In accordance with an embodiment of the present invention, conductors or mating electrodes, which are limited spatially by pn-transistors, are provided below the etched-away sensor material on the substrate. For the electrical passivation, HF-resistant dielectric layers can be deposited on the substrate (for instance, nitride) before the deposition of the sacrificial oxide. They prevent high-leakage currents over the pn-transitions which are exposed after the etching of the sacrificial oxide layer 2.

Figure 1C:
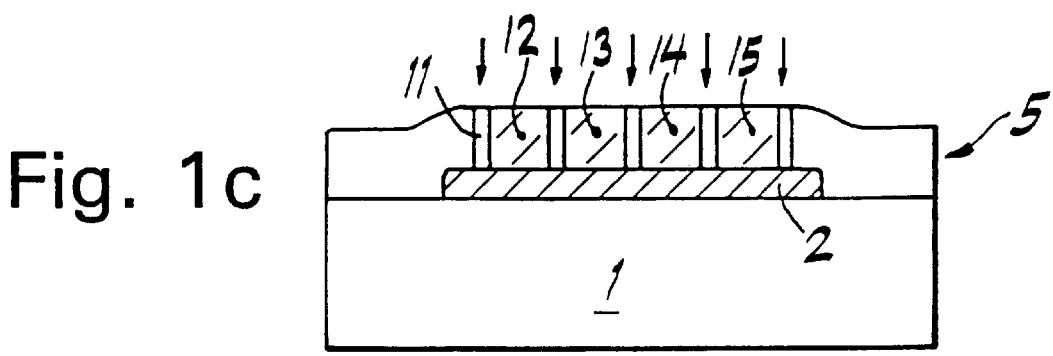

The micromechanical deflection parts are laid bare from the polycrystalline epitaxial layer in the region 8. As shown in FIG. 1c, deep narrow etching trenches are introduced for this purpose through the polycrystalline epitaxial layer 8 by a trenching process. For this purpose, a suitable mask is required, for instance as resist. The production of the trenches is effected by the technique of anisotropic plasma etching as dry etching process with high anisotropy. By the five trenches 11 shown, the lateral structural limitations of four tongue-shaped deflection parts 12, 13, 14, 15 are etched out.

In a further process step, the silicon-oxide layer 2 is removed as sacrificial layer. This removal is effected, with high selectivity with respect to the silicon, by hydrofluoric acid (HF).

Figure 1D:
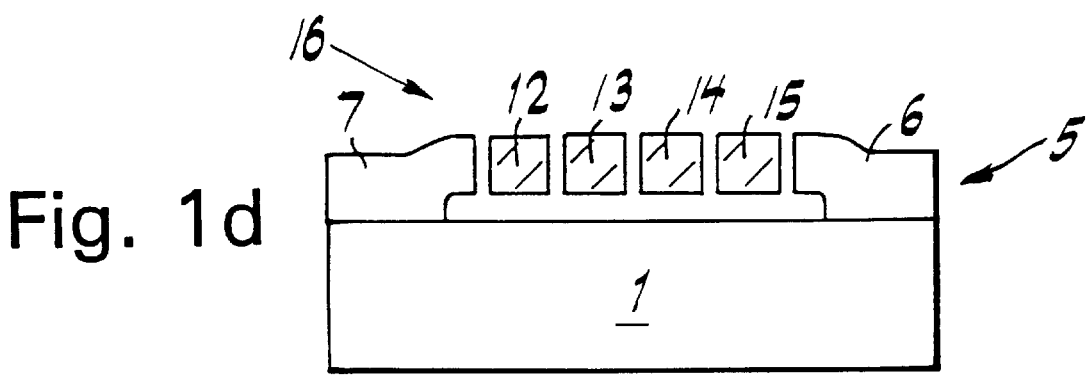

As can be noted from FIG. 1d, a micromechanical sensor 16 can thus be produced which has deflection parts 12, 13, 14, 15 of polycrystalline silicon which, in the support region at the connection to the silicon substrate 1, pass into single-crystal silicon. Upon the action of a force on the sensor, these deflection parts 12, 13, 14, 15 are deflected with respect to the rest of the sensor structure, in particular the silicon substrate 1. This deflection can be evaluated capacitively or piezoresistively for measurement purposes.

The method described above can be applied several times, one above the other, by alternate application of a silicon-oxide layer 2, other layers 10, and an epitaxial layer 5, so that, after corresponding etching processes, several layers of deflection parts 12, 13, 14, 15 can be obtained one above the other. Such embodiments are suitable, in particular, for capacitive acceleration sensors.

The deposition rate for the epitaxial layer is relatively high, so that epitaxial layer thicknesses, and thus thicknesses of the deflection parts 12, 13, 14, and 15, of 10 to 30 μm can be obtained.

FIGS. 2a to 2e show the production and development of a concrete micromechanical sensor 16, together with the integratability in a bipolar process for an adjacent transistor 17. The transistor 17 represents, for instance, IC circuits. More particularly, the transistor 17 may be an evaluation circuit for the mechanical deflection of the deflection parts in the sensor 16.

Figure 2A:
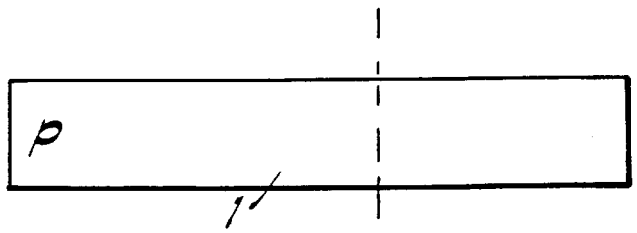
FIGS. 2a through 2e show cross sections through a sensor according to the present invention, which includes a transistor, during different stages of manufacture by a bipolar process.
Figure 2B:
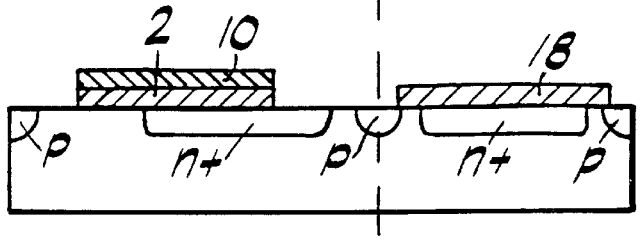
Figure 2C:
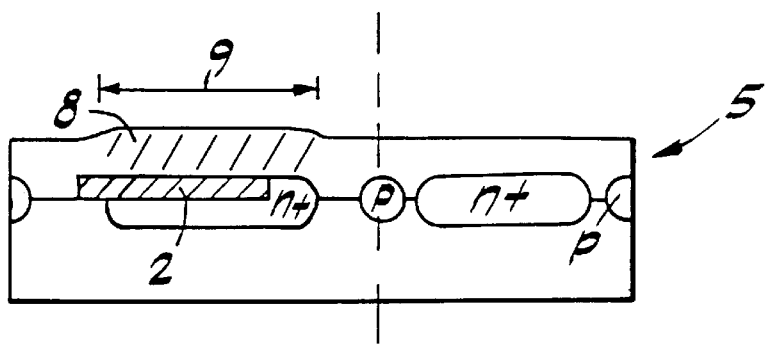

FIGS. 2a to 2e show an ordinary process stage in the bipolar technique after an n$^+$-diffusion (buried layer diffusion) and a p-diffusion (lower insulation diffusion). FIG. 2a shows, as a starting part, a support 1 of p-doped silicon substrate. The layers 2 and 10 shown in the left-hand region of FIG. 2b correspond to the layers 2 and 10 of FIG. 1a. The silicon-oxide layer 18 shown on the right side (the transistor is to be produced in the right-hand region) is removed for the further process steps, while the silicon layer 2 with the contact windows shown remains. As shown in FIG. 2c, the n-epitaxial layer 5 is then applied over this structure, it growing over the remaining silicon-oxide layer 2 in polycrystalline form in the region 8 corresponding to the size of the arrow 9.

Figure 2D:
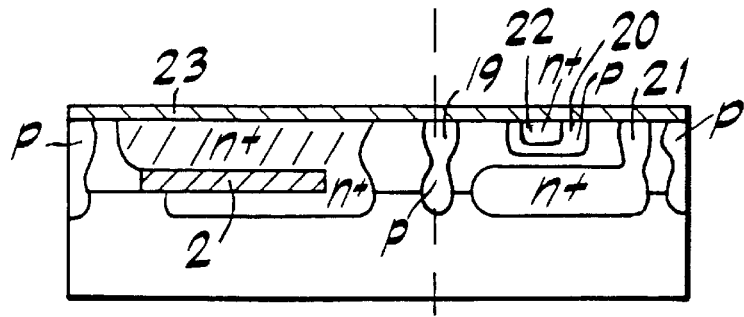

In accordance with FIG. 2d, an electric insulation is then produced by a p-insulation diffusion 19, as well as a p-base diffusion 20. Furthermore, an n$^+$-collector connection diffusion 21 and an n$^+$-emitter diffusion 22 are applied in a known manner in accordance with the bipolar process. An upper silicon-oxide layer 23 is furthermore applied.

Figure 2E:
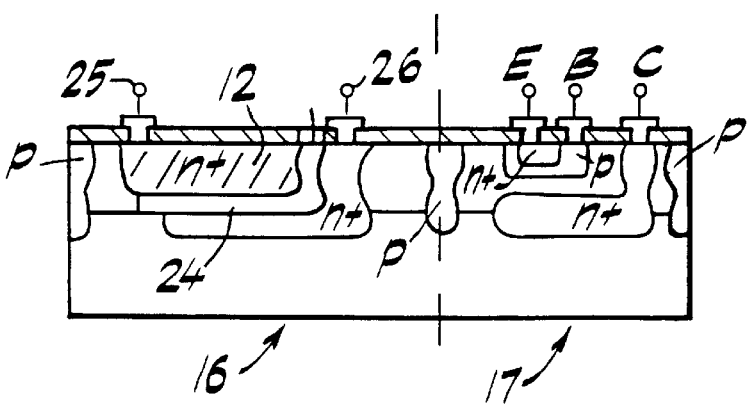

In further process steps according to FIG. 2e, a trench 11 is introduced for the lateral structural limitation of the tongue-shaped deflection part 12 and the silicon-oxide layer 2 is etched away as sacrificial layer with hydrofluoric acid in order to expose the underlying surface. Furthermore, contact openings and a metallization for connections are produced on the sensor 16, as well as the transistor connections E, B, C on the transistor 17.

As shown in FIG. 2e, there is thus created a micromechanical sensor 16 having a tongue-shaped deflection part 12 which can be deflected under the action of force within the air gap 24. Changes in capacitance can be tapped off and evaluated via the connections 25 and 26.

Figure 3A:
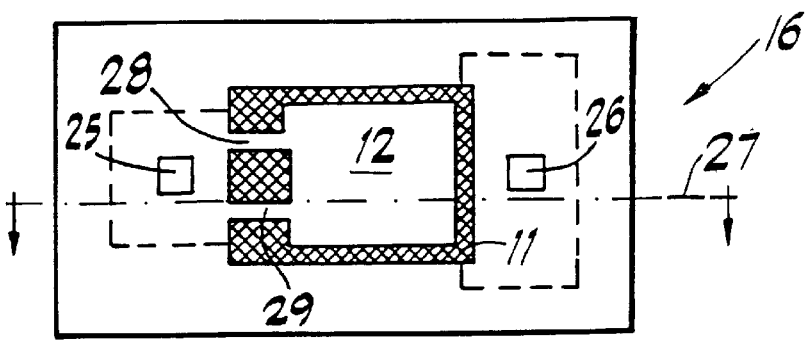
FIG. 3a is a top view of a sensor according to the present invention.
Figure 3B:
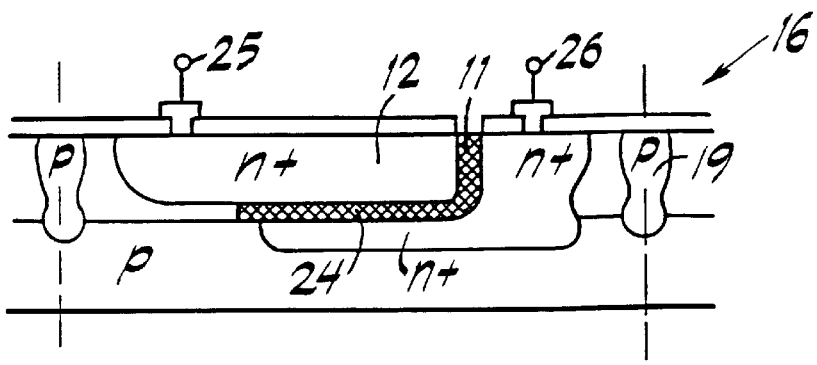

FIGS. 3a and 3b show in detail a sensor 16 corresponding to a manufacturing process in accordance with FIGS. 2a to 2e, left-hand side. FIG. 3b furthermore shows a corresponding cross section along a section line 27 from the top view of FIG. 3a.

From FIG. 3a it can be seen that, by means of the trenching process, a trench 11 has been produced which delimits a plate-shaped structure to form deflection part 12. Deflection part 12 is connected via two arms 28, 29 to the rest of the structure. As such, the sensor can be used as acceleration sensor, preferably for measuring movements vertical to the plane of the support.

Figure 4:
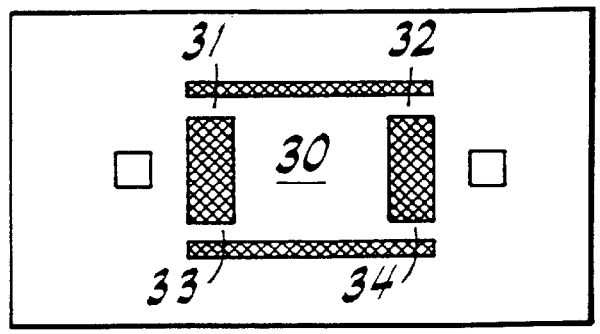
FIG. 4 is a top view of a second embodiment of a sensor according to the present invention.

In a further embodiment, shown in FIG. 4, a plate-shaped, approximately square deflection element 30 is held at its corners by four arms 31, 32, 33, 34. Such an embodiment is particularly suitable as a capacitive acceleration sensor.

Figure 5:
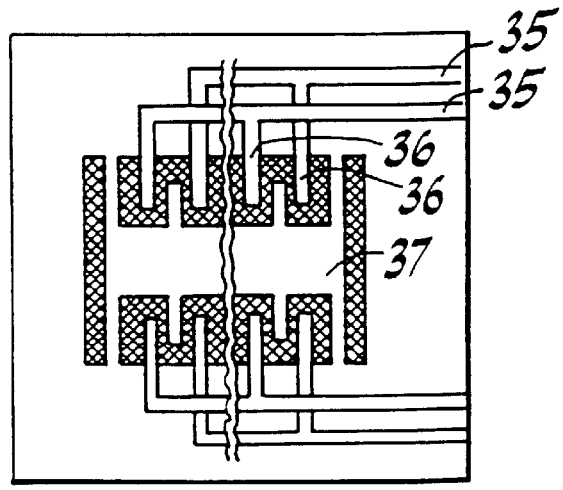
FIG. 5 is a top view of a third embodiment of a sensor according to the present invention.

From a top view of a third embodiment in accordance with FIG. 5, it can be noted that, by the technique described above, sensors having a large number of electrodes 36, possibly connected via conductive paths 35, can be produced. Opposite these stationary electrodes 36, there moves a free silicon mass produced in accordance with the method described above. It is provided, on its part, with electrodes which extend between the stationary electrodes 36. The deflection of the mass 37, as a result of acceleration in lateral direction, can thereby be sensed capacitively.

Figure 6:
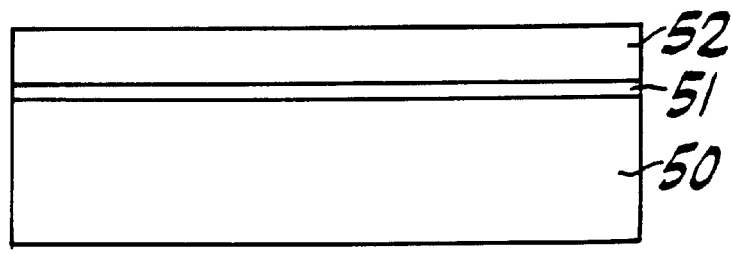
FIG. 6 is a cross-sectional view of a fourth embodiment of a sensor according to the present invention at a first stage of manufacture.
Figure 7:
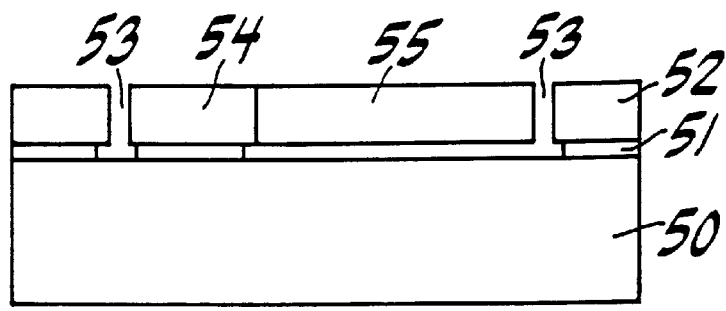
FIG. 7 is a cross-sectional view of the sensor shown in FIG. 8 along the line VII—VII.
Figure 8:
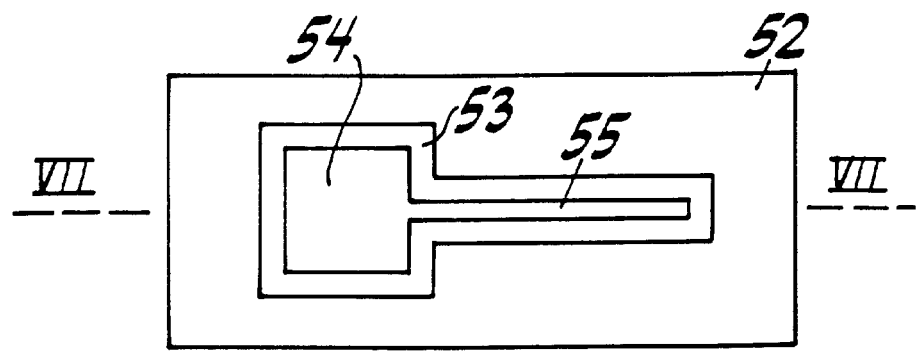
FIG. 8 is a top view of the fourth embodiment of a sensor according to the present invention at an advanced stage of manufacture.

FIGS. 6, 7 and 8 show another embodiment the present invention. FIG. 7 is a cross-section of FIG. 8 along the line VII—VII. FIGS. 6 and 7 show the fabrication process.

In FIG. 6, a single-crystalline silicon substrate 50 is covered by an etching-layer 51. Silicon-dioxide (SiO$_2$) is the preferred material for the etching-layer 51, although silicon nitride, glass or other materials can also be used as single layers or as multilayers on top of each other. On top of the etching-layer 51, a polycrystalline layer 52 is formed by an epitaxial process. Normally the term epitaxial layer refers to a single-crystalline silicon layer. The layer 52 includes polycrystalline silicon material that is formed by a process that is normally used for the fabrication of a single-crystalline epitaxial layer on a single-crystalline silicon substrate. Epitaxial processes that are used for the fabrication of the layer 52 can be found, for instance, in the book VLSI Technology by Sze (McGraw-Hill, 1983, Chapter 2). As already described in FIG. 1a, there might be a polysilicon start layer applied on top of the layer 51 by a conventional polysilicon process (Sze, Chapter 3.3) before the polysilicon layer 52 is applied on top of the layer 51 by an epitaxial process.

FIG. 7 shows the further processing of the device shown in FIG. 6. As already described, an etching process is applied to form the narrow-etched grooves 53 that extend from the upper side of layer 52 to the etching-layer 51. As can be seen in the top view of FIG. 8, the trench 53 is used to form, out of the silicon layer 52, a structure that can be used as a sensor. After that, an etching process that etches the etching-layer 51 is applied to etch the etching-layer 51 beneath part of the layer 52.

FIG. 8 shows a top view of the structure that is formed out of the silicon layer 52. The anchor area 54 remains connected to the silicon substrate 50 by the etching layer 51 that is not completely etched below the anchor area 54. Below the movable tongue 55 the etching-layer 51 is completely removed, so that the tongue 55 may be moved by means of an acceleration. Means for detection of the deflection of the tongue 55 are not shown, but are well known in the art. Because of their different lateral dimension, the etching-layer 51 remains below the anchor area 54 while the etching-layer 51 is completely etched below the tongue area 55. The etching process of the etching-layer 51 is stopped after the etching-layer is completely removed below the tongue area 55 and is still not removed below the anchor area 54. A typical etching process for SiO$_2$ includes, for example, dipping the device in hydrofluoric acid.

FIG. 8 is only an example of a sensor that can be formed by the process illustrated in FIGS. 6 and 7. Since it is possible to fabricate anchor areas 54 that are firmly connected to the substrate 50 and movable areas 55 that can be moved with respect to the substrate 50, this process can be used to fabricate all sorts of micromechanical sensor elements, especially, for example, sensor elements which are described in PCT application Ser. No. WO 92/03740. Since the deposition rate of the epitaxial processes is very high, the sensor elements can be fabricated with much higher thickness than sensor elements described in PCT application Ser. No. WO 92/03740.

What is claimed is:
1. A micromechanical sensor, comprising:

a support of silicon substrate having an epitaxial layer of polycrystalline silicon applied thereon, a part of the epitaxial layer being laid bare by an etching process to form at least one micromechanical deflection part, the at least micromechanical deflection part connected, at least one side, to the silicon substrate via a support region made of single-crystal silicon, the at least one micromechanical deflection part being deflected out of an initial position upon application of a force to the micromechanical sensor, the micromechanical sensor further comprising an evaluation circuit for evaluating the deflection of the micromechanical deflection part, wherein the micromechanical deflection part includes a plate supported at its corners, and wherein the micromechanical sensor is a capacitive acceleration sensor with lateral sensitivity.

2. A micromechanical sensor, comprising:

a support of silicon substrate having an epitaxial layer of polycrystalline silicon applied thereon, a part of the epitaxial layer being laid bare by an etching process to form at least one micromechanical deflection part, the at least micromechanical deflection part connected, at least one side, to the silicon substrate via a support region made of single-crystal silicon, the at least one micromechanical deflection part being deflected out of an initial position upon application of a force to the micromechanical sensor, the micromechanical sensor further comprising an evaluation circuit for evaluating the deflection of the micromechanical deflection part, wherein the micromechanical deflection part includes a plate supported at its corners, and wherein the micromechanical sensor is a capacitive acceleration sensor with sensitivity in a direction of detection.

3. A micromechanical sensor comprising:

a single-crystalline silicon substrate having a substrate surface; and a sensor element arranged on the substrate surface and including at least one polycrystalline silicon deflection part and silicon support regions, the at least one deflection part being deflectable from an initial position upon an application of a force to the sensor element, the at least one deflection part being connected to the silicon substrate via the support regions, wherein the at least one polycrystalline silicon deflection part is converted into at least one single-crystalline silicon deflection part at the support regions.

4. The micromechanical sensor according to claim 3, further comprising:

a further region having a single-crystalline silicon layer and being provided on the single-crystalline silicon substrate, the further region forming an evaluation circuit for evaluating a deflection of the micromechanical sensor.

5. The micromechanical sensor according to claim 4, wherein the evaluation circuit is a capacitive evaluation circuit.

6. The micromechanical sensor according to claim 4, wherein the evaluation circuit is a piezoresistive evaluation circuit.

7. The micromechanical sensor according to claim 3, wherein the at least one deflection part includes at least one tongue.

8. The micromechanical sensor according to claim 3, wherein the at least one deflection part includes a plate supported at its corners for producing the micromechanical sensor as a capacitive acceleration sensor with at least one of a lateral sensitivity and a sensitivity in a direction of detection.

9. The micromechanical sensor according to claim 3, wherein at least one deflection part includes a plurality of deflection parts made of superimposed epitaxial layers, the plurality of deflection parts being laid bare.

10. The micromechanical sensor according to claim 3, wherein the single-crystalline silicon substrate includes a silicon wafer oriented in one of the crystallographic directions (111) and (100).

11. The micromechanical sensor according to claim 4, further comprising:

a sensor part and an evaluation part, wherein the evaluation circuit is arranged on the single-crystalline silicon substrate, the evaluation circuit including integrated electronic circuits.

12. The micromechanical sensor according to claim 11, wherein the sensor part is electrically isolated from the evaluation part by one of insulation diffusions, trenches and further structural parts on the single-crystalline silicon substrate.

* * * * *